United States Patent [19]

Nötzold et al.

[11] 4,308,447
[45] Dec. 29, 1981

[54] APPARATUS FOR LIQUEFYING MELTABLE MATERIAL

[75] Inventors: Norbert Nötzold; Henning J. Claassen, both of Lüneburg, both of Fed. Rep. of Germany

[73] Assignee: Firma Henning J. Claasen, Lüneburg, Fed. Rep. of Germany

[21] Appl. No.: 67,556

[22] Filed: Aug. 16, 1979

[30] Foreign Application Priority Data

Aug. 21, 1978 [DE] Fed. Rep. of Germany ....... 2836545

[51] Int. Cl.³ .............................................. F27B 14/00
[52] U.S. Cl. .................................. 219/421; 219/422; 219/424; 219/425; 219/521; 222/146 HE; 222/330; 219/530; 118/202; 425/144; 432/210
[58] Field of Search ............... 219/420, 421, 422, 437, 219/521, 523, 530, 540, 544, 424, 425, 426, 427; 222/146 HE, 288, 325, 330, 377; 432/210; 134/19 R, 22 R; 118/202, 681; 425/143, 144; 165/185

[56] References Cited

U.S. PATENT DOCUMENTS

| 2,773,496 | 12/1956 | Czarnecki | 222/146 HE X |
| 3,130,876 | 4/1964 | Baker | 222/146 HE |
| 3,377,466 | 4/1968 | Paulsen | 219/421 |
| 3,531,023 | 9/1970 | Mercer | 222/146 HE |
| 3,792,801 | 2/1974 | Baker et al. | 222/146 HE |
| 3,876,105 | 4/1975 | Kelling | 222/56 |
| 3,964,645 | 6/1976 | Scholl | 222/146 HE |
| 4,178,876 | 12/1979 | Nicklas | 219/421 X |
| 4,219,728 | 8/1980 | Mercer | 219/421 |

Primary Examiner—Volodymyr Y. Mayewsky
Attorney, Agent, or Firm—Michael J. Striker

[57] ABSTRACT

An apparatus for liquefying meltable material comprises a container adapted to be filled with the material to be liquefied. The container has a heavy bottom wall formed with closely adjacent perforations which taper in downward direction. The sum of the open cross-section of the perforations at the upper face of the bottom wall is only slightly smaller than the total area of the latter, whereas the sum of the smallest cross-sections of the perforations is only a small fraction of the total area of the bottom face of the bottom wall. The bottom wall is heated by electrical heating elements located in ribs separating the perforations from each other to a temperature to liquefy the material passing from the container into the perforations and the liquefied material flows in a collecting trough arranged below the container and separated by a heat insulating layer therefrom. Additional heating elements cooperate with said trough to maintain the material therein in liquid state and at a temperature of use and the material is discharged from the collecting trough preferably with the help of a motor driven gear pump.

15 Claims, 4 Drawing Figures

APPARATUS FOR LIQUEFYING MELTABLE MATERIAL

BACKGROUND OF THE INVENTION

The present invention relates to an apparatus for liquefying meltable material, especially melt adhesives, and the apparatus includes a supply container adapted to be filled with a material to be melted and having a perforated heatable bottom wall for melting the material and a collecting trough below the bottom wall for receiving the molten material passing through the perforations, and preferably a discharging device for transporting the molten material from the trough and feeding the same to an applying device.

Meltable materials, also called hot melts, find increasing use in the industry, for instance for coating substrates and also as temporary and/or permanent fusion adhesives.

The known hot melts are predominantly binary and tertiary mixtures of basic polymers, adhesive resins and waxes, softeners and fillers.

Depending on their use, one can differentiate between permanent and temeporary hot melts.

The permanent hot melts are predominantly so-called melt contact adhesives, also designated as pressure sensitive adhesives, since the adhesive layer retains also at room temperature a specific stickiness.

Temporary meltable materials and fusion adhesives have only in liquid form a predetermined minimum stickiness.

With the last group it is only possible to obtain a coating or cementing by changing the condition of the material from a liquid to a solid condition.

Hot melts and fusion adhesives are available in different form such as:

Temporary masses such as granulate, powder, slivers, pearls, strands, candles and so on, and permanent masses such as blocks, strands and similar masses.

The basic polymers which are mainly used as hot melts can be divided in two main groups:

(a) Thermoplastic elastomers; and (b) thermoplastic artificial resins, respectively plastics.

The thermoplastic elastomers include, among other materials, ethylene-vinylacetate-copolymers, ethylene-ethylacrylate-copolymers, polystyrole-butadien-polystyrene-block polymers, polystyrole-isoprene-polystyrene-block polymers, polyethylene, polypropylene, butylisobutyl- and isoprene-rubber types and ethylene-propylene rubber.

The thermoplastic artifical resins, respectively plastics, include polyvinyl acetate and the copolymers thereof, saturated polyester and copolyester, polyurethane, polyamides and copolyamides.

The hot melts and fusion adhesives are used for many different purposes, because they have many technical and commercial advantages. Thus the hot melts may be used to coat substrates to provide, for instance, a gas impermeable surface thereof. The temporary fusion adhesives are used, for instance, for cementing shoe and leather parts to each other, to glue carboards to each other, to glue the back of the books to the remainder thereof, to glue parts of furniture to each other, as well as during many other assembly and finishing operations.

The permanent adhesives are especially used for the production of adhesive tapes, adhesive foils, for self-sealing labels, and so on, that is at all occasions in which a permanent stickiness is required.

During the treatment of hot melts and fusion adhesives the stability of the material is one of the most essential parameters since these materials are during the treatment thereof in especially stimulated condition. In the molten liquid form these materials are move liable to be subjected to thermic and/or chemical-oxidizing reactions than in semisolid or solid condition. Such heat reaction may include a change in the color, especially a darkening of the material, a change of the viscosity thereof which is either reduced by depolymerization or increased by lattice-like polymerization, and deterioration of the rheological and adhesive characteristics of the material.

In order to prepare hot melts for use, the material is liquefied by heating in a liquefying apparatus and by a transporting device transported out of the apparatus. A heated transporting hose may, for instance, be connected to the apparatus and leading to a so-called application head.

An essential problematic of apparatus of the above-mentioned type consists in that the hot melts should usually not be heated above a predetermined temperature, respectively not be heated too long, since otherwise the mass will decompose. Since the material is usually fed in the form of granules from above into the supply container of the apparatus and passes continuously through the apparatus to thereby be liquefied, the amount of the hot melt which is maintained at relatively high temperature must be held relatively small. Furthermore, the amount of material in the supply container must be maintained at a sufficiently low temperature so that it will still remain in non-caking condition above the perforated bottom wall of the container. Correspondingly, the heated perforated bottom wall of the container should transfer the least possible amount of heat in upward direction, and further assure in the smallest possible vertical region the necessary heating of the mass from a temperature essentially below the softening temperature of the mass to a temperature which will produce liquefidation of the same. Finally, it is necessary that the temperature in the supply container should increase only from the top to the bottom thereof, while the temperature over the width of the container should be maintained substantially constant. This permits to approach the maximum permissible temperature more closely. Since the hot melt ought not to be excessively heated, the output of molten material per time unit is in known apparatus of this type relatively small.

A higher output could only be obtained if the heat transmitting surfaces of the perforated bottom wall of the container would be brought to a non-permissible high temperature, which in turn would reduce the quality of the adhesive.

In one known apparatus of this type, the perforated bottom wall of the supply container comprises a plate provided with vertically extending cylindrical bores which are heated by resistance heaters arranged in this plate. To control the temperature a temperature sensor is used, sensing the temperature of the perforated bottom wall and cooperating in the usual manner with a thermostat device which thus keeps the temperature of the perforated bottom wall constant. This known construction has a low efficiency, that is the output of liquefied material per time unit and unit of area of the bottom wall is relatively small. An additional essential disadvantage of this known apparatus is, that due to the relative high temperature prevailing in the collecting trough for heating the liquefied mass to the necessary end temperature, the temperature of the whole supply container, also at a considerable distance from the perforated bottom thereof, increases during operation of the device to such a high temperature that the mass in the container located considerably above the perforated bottom wall melts and bakes together in the upper region of the container, so as not to slide anymore downwardly in the same.

The heatable perforated bottom was originally provided in order to assure a preliquefying of the meltable mass at relatively low temperature, without excessively heating the mass in the container above the bottom wall and to subsequently thereto bring the liquefied material dropping into the collecting trough to the necessary temperature to transport the liquefied material to the application device.

This aim has not been or at least insufficiently accomplished with the constructions according to the prior art, that is, either the mass of material in the supply container has been damaged by excessive heating, or the output of the apparatus of molten material at the proper temperature was too small. As mentioned before, in one of the known constructions the perforated bottom wall of the container mounted directly on a collecting trough is constructed as a planar, electrically heated plate provided with cylindrical vertical bores therethrough. In this construction a relatively large amount of heat rises from the perforated bottom wall upwardly and the heat transmission between the bottom wall and the mass in the container is bad. Nevertheless, the wall of the supply container and therewith the material therein is excessively heated in an undesired manner since the high temperature from the wall of the collecting trough is transferred directly into the wall of the supply container. Finally, the heating output is small since the perforated bottom has only a relatively small surface in contact with the mass passing therethrough.

In another known construction in which the perforated bottom is formed by a grate or rods of circular cross-section there is also not an improved output and no improved temperature distribution in the mass to be liquefied. In this second known construction the passage of the adhesive through the perforated bottom is relatively small, while the melting output is low. Nevertheless, a large amount of heat passes from the collecting trough maintained at high temperature into the wall of the supply container so that the material in the upper region of the latter will cake together. A further drawback of both known constructions is an unfavorable temperature distribution in the material in the supply container-since the temperature of this material adjacent the wall of the container will be higher than in the center thereof.

SUMMARY OF THE INVENTION

It is an object of the present invention to provide an apparatus for liquefying meltable material which avoids the disadvantages of such apparatus known in the art.

More specifically, it is an object of the present invention to accelerate the melting process in the apparatus so that no thermal and/or oxidation reactions will occur and practically no change in the rheological characteristics of the material to be melted will be produced.

It is a further object of the present invention to provide an apparatus in which the output of molten material is large enough so as to supply the application device connected to the apparatus with the necessary liquefied mass.

It is yet a further object of the present invention to maintain the material in the supply container above the perforated bottom wall thereof at such a constant temperature, substantially equal through the width of the container, so that the mass will always freely slide towards the bottom wall and not be brought to an undesired high temperature, that the mass in the region of the perforated bottom wall is brought quickly to the liquefying temperature, which usually is 10 to 20% above the softening point (measured in degree C.), without raising the temperature at the upper surface of the bottom wall to an undesirable high temperature, and finally to assure that the relatively high temperature in the main melting zone, that is in the collecting trough located below the bottom wall of the container, will not spread upwardly so as to unduly heat the material above the perforated bottom wall.

With these and other objects in view, which will become apparent as the description proceeds, the apparatus of the present invention for liquefying meltable material mainly comprises a supply container adapted to be filled with material to be liquefied, in which the container has a bottom wall of predetermined height provided with adjacent perforations tapering at least over a major part of the height of the bottom wall in downward direction and being arranged in such a manner that the sum of the open cross-sections of the perforations at the upper face of the bottom wall is only slightly smaller than the total area of this upper face and that the sum of the smallest cross-sections of the perforations is only a small fraction of the total area of the bottom face of the bottom wall. The apparatus includes further a collecting trough beneath the bottom wall of the container, a heat insulation between the container and the collecting trough to prevent heat transmission from the side wall of the collecting trough to the side wall of the supply container, first controllable heating means in the bottom wall for maintaining the latter at a first predetermined temperature so that the material in the perforations will quickly melt and flow into the receiving trough, second controllable heating means cooperating with the collecting trough for maintaining the latter and the material therein at a second predetermined temperature, and means for discharging the liquefied material from the collecting trough.

Due to the construction of the perforated bottom wall according to the present invention, the latter will practically have no upper, horizontally extending face portion. According to the present invention, the upwardly facing surface portions of the perforated bottom wall of the supply container are steeply inclined in downward direction, so that they transmit the heat primarily not in upward direction, but laterally into the particles which slide through the perforations to be melted therein. The tapering of the perforations in downward direction takes also into account the reduction of the volume of the material during liquefying thereof. Due to the construction of the bottom wall in accordance with the present invention, this bottom wall has also an exceedingly large surface, which in turn will assure that the necessary heating of the material in the region of the perforated bottom wall can be carried out quicky and with relatively low temperature. Furthermore, due to the tapering of the perforations in downward direction, there remains in the ribs between the perforations sufficient space to mount electrical resistance heating elements therein.

Preferably, the perforations are tapered over the whole height of the bottom wall. This permits an optimal construction, with optimal heat convection within the perforated bottom wall. Preferably, the tapering of the perforations is stepless. The extent of the taper, however, must not be constant. Thus, it is for instance preferred that the extent of the tapering be larger in the upper region of the perforations than in the lower regions thereof.

According to a preferred construction of the present invention, the perforations have at least in the upper regions thereof the form of a truncated pyramid and are arranged in form of a quadrangular raster. In this way, the non-perforated parts of the bottom wall will have the form of crossing grate elements with upper edges so that the necessary bores for the mounting of electrical resistant heaters may easily be provided in these grate elements.

It is further preferred that the perforations have at least in the lower regions thereof essentially the form of cone frustum. These cone frustums have preferably a smaller taper than the pyramid frustums located above. This construction has proven in practice especially advantageous.

As mentioned before, the heating of the bottom wall is carried out by electrical resistance heating elements located in the ribs between the perforations of the bottom wall.

Such electrical heating elements may also be used at different constructions of the perforated bottom wall, for instance then, when at least in the upper region the perforations have a hexagonal cross-section. In this case, the electrical resistance heating elements may be molded, as, eventually curved, electrical resistance conductors carrying rods of fire-proof clay, into the perforated bottom wall. The bottom wall preferably is integrally formed with the side wall of the supply container. It consists preferably of an alloy of good heat conductivity, for instance of an aluminum or copper alloy. It is also possible to arrange a further heat insulation between the perforated bottom and the side wall of the supply container.

In a preferred construction according to the present invention the diameter of the perforations at the upper face of the bottom wall is about 40-100% of the height thereof and preferably between 55 and 70% of this height. During tests, a diameter of the perforations which has been 60 to 65% of the height of the bottom wall has proven especially advantageous. If the perforations at the upper face of the bottom wall have not a circular, but as preferred, a quadrangular cross-section, then this quadrangular cross-section should be equal to that of a circle having the above-mentioned diameter.

The height of the bottom wall is advantageously between 40 to 100 millimeters and preferably between 50 and 70 millimeters. A height of 60 millimeters has been proven especially advantageous.

The perforations are arranged closely adjacent each other so that the remaining portions of the perforated bottom wall between the perforations form upwardly directed rounded edges at the upper face of the bottom wall. The sum of the smallest cross-section of the perforations, which are preferably located at the bottom face of the perforated bottom wall is held preferably between 3 and 15% of the total surface area of the bottom wall, and preferably between 4 and 8%. A total cross-section for the smallest openings of the perforations between 5 and 6% of the total area of the bottom wall has been proven especially advantageous.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
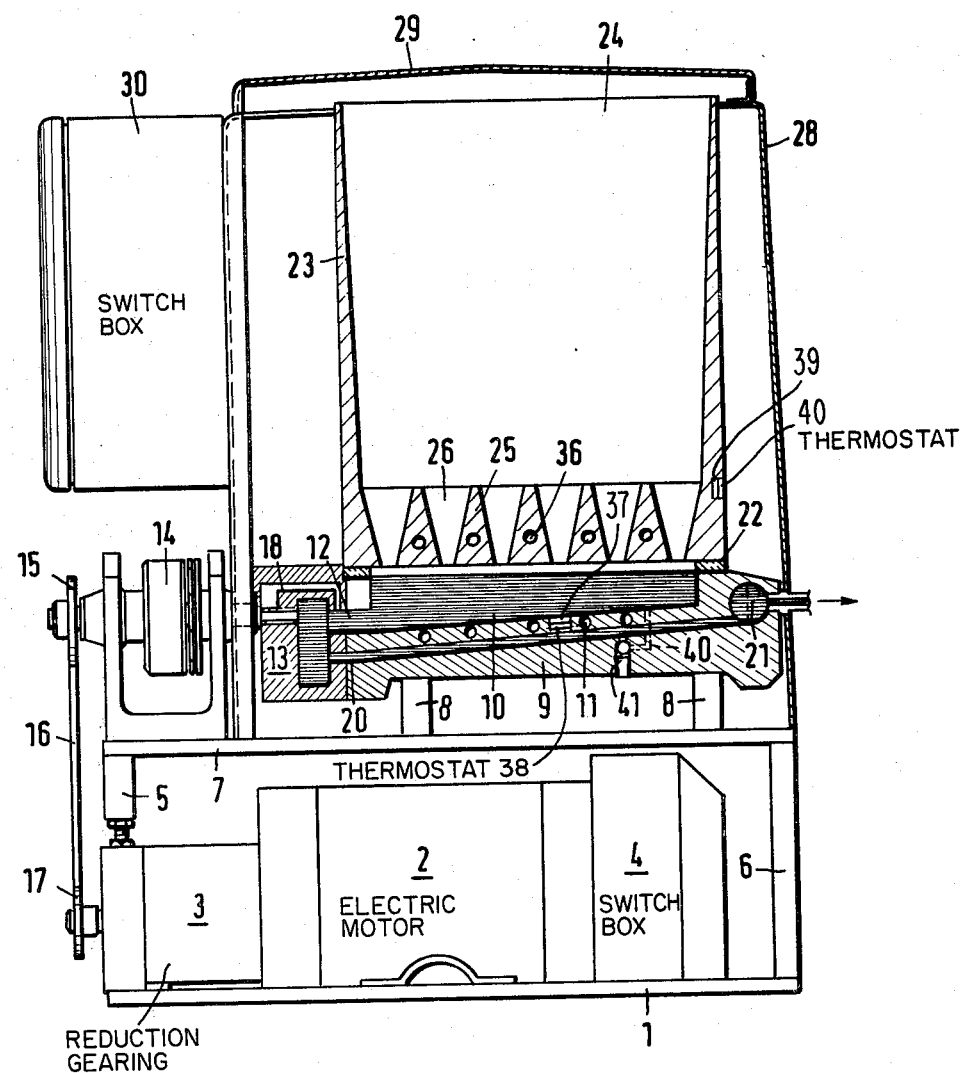
FIG. 1 schematically illustrates a vertical cross-section through the center of the apparatus according to the present invention.

Referring now to the drawing, and more specifically to FIG. 1 of the same, it will be seen that the apparatus according to the present invention has a base plate 1 on which an electric drive motor 2 provided with a reduction gearing 3 is mounted. On the side of the electric motor 2 opposite the reduction gearing 3, there is a switch box 4 mounted on the base plate 1.

A carrier plate 7 is mounted by legs 5 and 6 on the base plate 1. A collecting trough 9, preferably formed as light metal casting, is carried by means of a plurality of legs 8 on the carrier plate 7. The collecting trough 9 is adapted to receive in the cavity 10 thereof the material, indicated by the closely extending horizontal lines in FIG. 1, which has to be brought to the working temperature. Below the cavity 10 of the collecting trough 9 there are provided in corresponding bores electrical resistance heating rods 11, which serve to bring the content of the collecting trough 9 to a desired adjustable end temperature. For this purpose a heat sensor, not shown in the drawing, is arranged closely adjacent the bottom of the collecting trough 9 which, in a manner well known in the art, cooperates with a thermostat, likewise not shown in the drawing, to maintain a constant predetermined temperature in the collecting trough 9. A passage 12 leads from the collecting trough 9 to a schematically indicated gear pump 13, which is driven over a magneto coupling 14, a pulley 15, a belt 16 and a further pulley 17 mounted on the output shaft of the reduction gearing 3. A return conduit 18 for the liquefied material entering into the bearings of the gears of the gear pump 13 is also schematically indicated in FIG. 1.

A conduit 20, likewise held at the required temperature by the heating rods 11, leads from the gear pump 13 to a sieve 21, which prevents passage of undesired rigid particles with the liquefied adhesive. Downstream of the sieve 21 is a conduit, only partially shown, likewise heated and maintained at a constant temperature, which leads to an application device, not shown in the drawing.

A heat insulating layer 22, formed for instance of an abestos layer combined with plastic, is provided at the upper edge of the collecting trough 9, and this layer 22 is of sufficient thickness in order to prevent an undesired high heat transmission from the collecting trough maintained at relatively high temperature to the wall 23 of the supply container 24 of quadrangular cross-section arranged above the collecting trough 9. Integrally formed with the side wall 23 of the supply container 24 is the perforated bottom wall 25 of this supply container. The perforated bottom wall 25 will be further described in connection with FIGS. 2-4. However, as can already be visualized from FIG. 1, the perforated bottom wall 25 is provided with downwardly tapering perforations 26, through which the melted adhesive can flow downwardly into the collecting trough 9, which forms the main melting zone of the apparatus. The temperature in the collecting trough 9, controlled by a thermostat 38 provided with a heat sensor 37, is usually held 20 to 30% higher than the temperature in the region of the perforated bottom wall 25. The temperature of the perforated bottom wall 25 is likewise held at a desired constant value by means of a known thermostat device 40 provided with a temperature sensor 39, not shown in the drawing, and located in the region of the bottom wall 25. The supply container 24 is surrounded with a heat insulating jacket 28, laterally spaced from the side wall 23 of the supply container and the upper end of the latter is closed by a cover 29, which has to be removed for filling the supply container 25 with the material to be liquefied. To the left side, as viewed in FIG. 1, of the jacket 28, there is connected a switch box 30 for the electrical control elements for the regulation of the temperature of the various heating elements of the apparatus.

Figure 2:
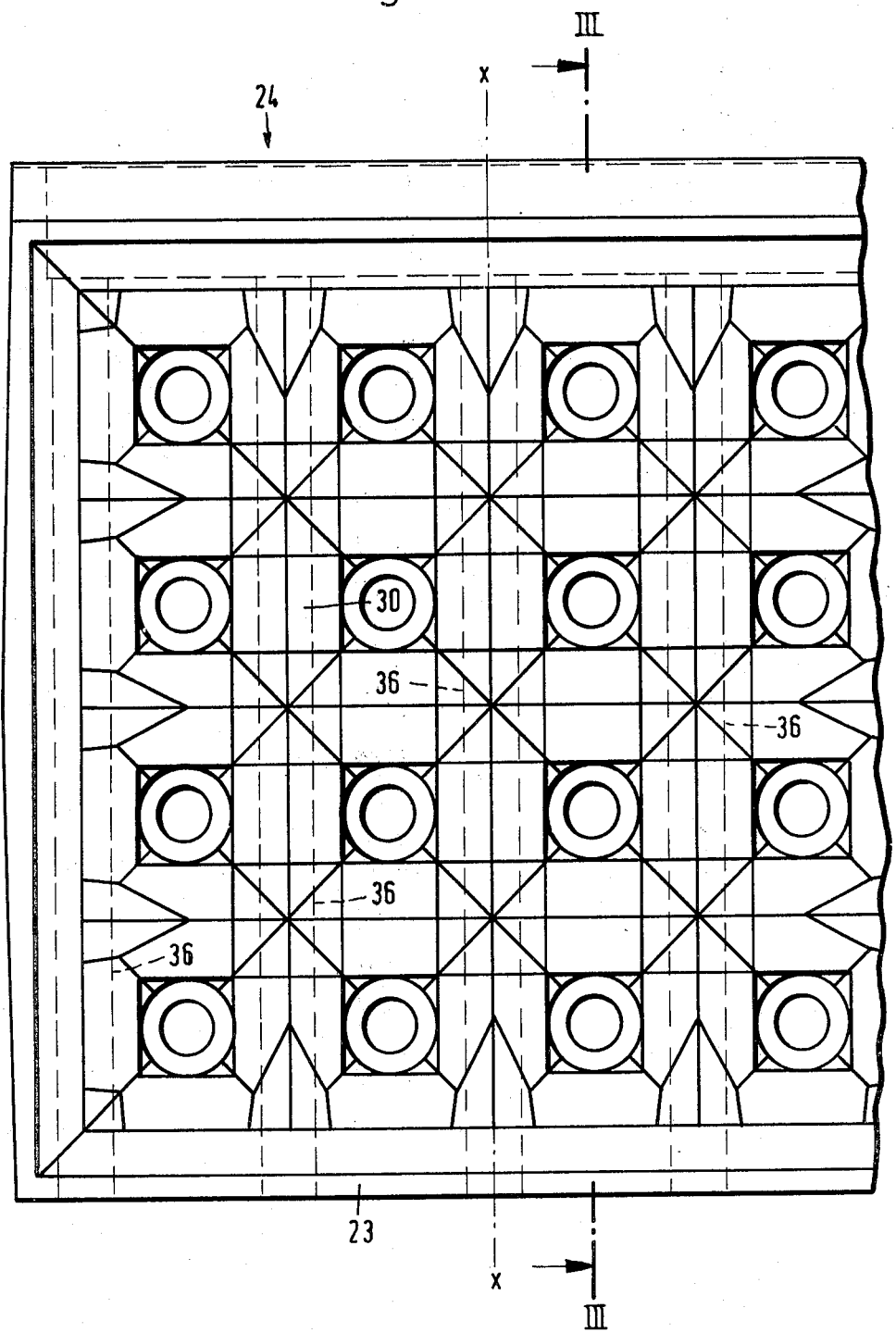
FIG. 2 illustrated, at a larger scale than FIG. 1, a top view of a portion of the supply container and the perforated bottom wall thereof.
Figure 3:
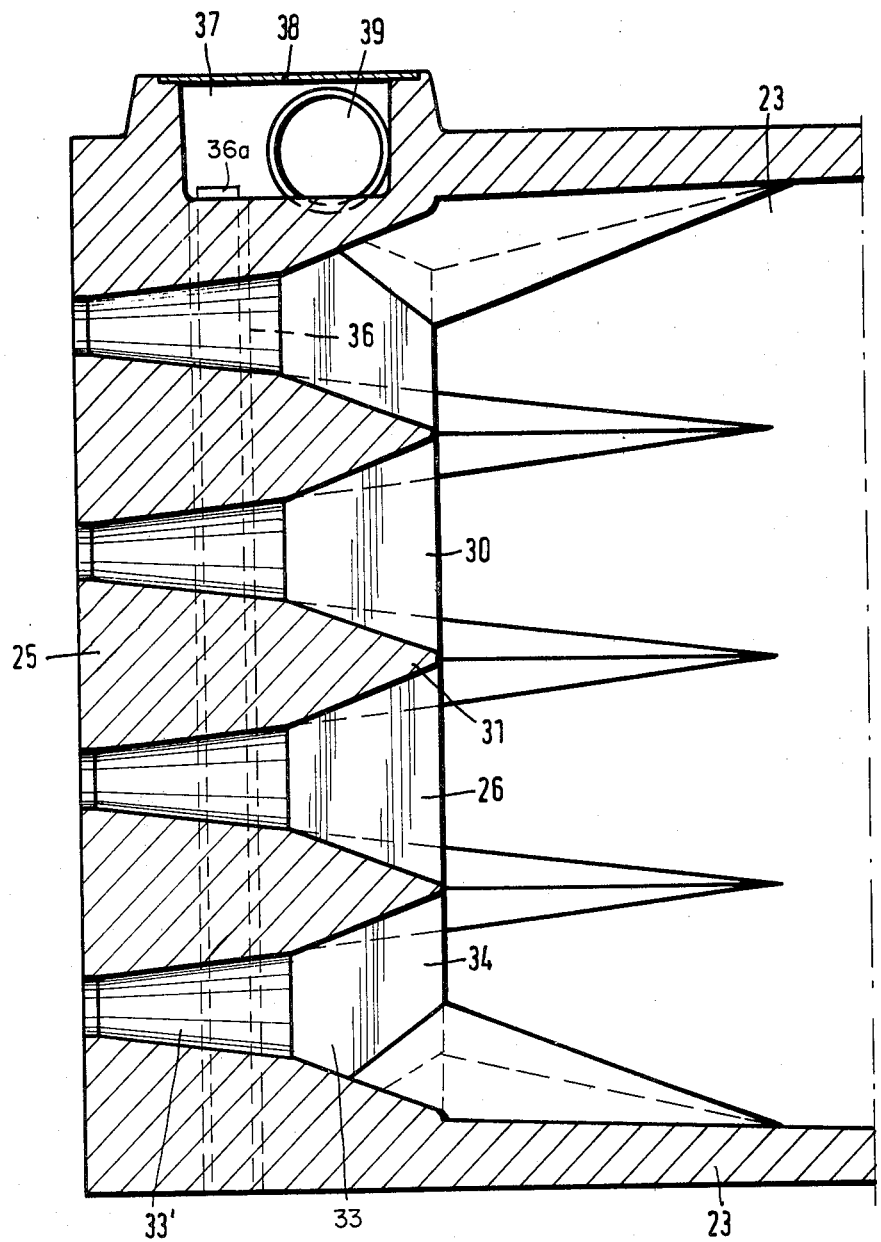
FIG. 3 is a cross-section taken along the line III—III of FIG. 2.
Figure 4:
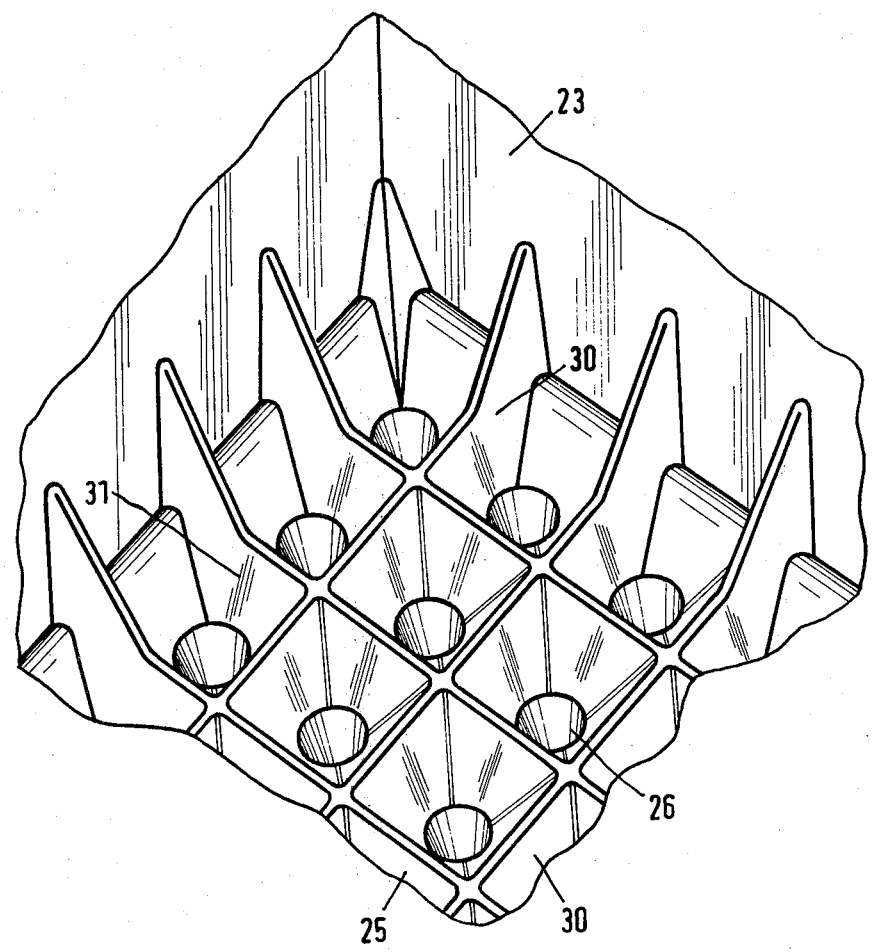
FIG. 4 is a perspective view of a corner of the perforated bottom wall.

As best shown in FIGS. 3 and 4, the perforated bottom wall 25 is provided with crossing ribs 30 and 31. These ribs have in the upper region thereof an upwardly tapering wedge-shaped profile, the upper edge of which is slightly rounded as best shown in FIG. 3. This upper region of the ribs 30, 31 is slightly shorter than the lower regions thereof in which the exact shape of the crossing grate element deviates from the upper region in that the perforations remaining between the crossing elements have the form of downwardly tapering steep cone frustums 33'. In the upper region 34 the perforations have the form of pyramid frustums 33 and the transition between the two regions is more or less continuous so that nowhere detrimental edges are formed. Actually, the transition between the two regions is rounded in the same manner as the upper edges. Due to the difficulty to properly illustrate this feature in FIGS. 2-4, the transition between the two regions is shown in these Figures more or less abruptly.

As shown in FIGS. 2 and 3 there are provided a plurality of parallel bores 36 respectively extending through the ribs 30 substantially midway through the height of the same and through the side wall portions of the supply container extending normal to the ribs 30. Heating elements, consisting for instance of electrical resistance elements insulated in tubes of fired clay, are located in the bores 36. Each of the tubes is provided with two parallel electrical resistance wires which are integrally connected to each other at the end of each tube located at the bottom of FIGS. 2 and 3 and at the upper side of these Figures there is provided a channel 37 in the wall 23 in the region of the perforated bottom 25. The channel 37 is closed by a cover plate 38. The electrical connection between the plurality of heating wires in the bore 36 is carried out in the channel 37 and a bore 39 communicating with the channel 37 serves for leading the necessary connecting wires to the outside.

A bypass conduit 40 is also provided leading from the conduit 20 to the cavity of the collecting trough 9 and a check valve 41 is located in the bypass conduit 40. This check valve 41 opens if the pressure in the conduit 20 surpasses a predetermined pressure. In this way the gear pump 13 can also operate if no adhesive is discharged from the apparatus.

The above-described apparatus will be operated as follows:

At first the electrical heating elements are switched on and held by the thermostat devices connected thereto at the desired temperature, independent of whether material to be melted is in the apparatus or not. Then the cover 29 is opened and the supply container 24 is filled with adhesive, which is, for instance, in form of granules. The adhesive granules slide down into the conical perforation in the bottom wall 25 and at first close the same. However, the material will be quickly liquefied through the heat in the perforated bottom wall 25 and drips now downwardly at a temperature which maintains the adhesive liquid, but at a temperature which is still below the temperature of use, into the collecting trough 9, which forms the main melting zone. Slowly the whole content in the supply container 24 slides downwardly until the supply container 24 is filled again. In the collecting trough 9 the material is further heated to the temperature of use and flows from the collecting trough 9 through the gear pump 13 into the conduit 20 and past the sieve 21 into the application device, not illustrated in the drawing.

It is understood that the apparatus described above can also be used for liquefying other material than adhesives.

It will be understood that each of the elements described above, or two or more together, may also find a useful application in other types of apparatus for liquefying meltable material, differing from the types described above.

While the invention has been illustrated and described as embodied in an apparatus for liquefying adhesives, it is not intended to be limited to the details shown, since various modofications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Apparatus for liquefying meltable material comprising a supply container adapted to be filled with a material to be liquefied, said container having a peripheral wall and a bottom wall, both of highly heat conductive material, said bottom wall having a predetermined height and being constructed by ribs crossing each other and each tapering in upward direction so as to provide in said bottom wall adjacent perforations tapering in downward direction and arranged in such a manner that the sum of the open cross-sections of the perforations at the upper face of said bottom wall is only slightly smaller than the area of said upper face and that the sum of the smallest cross-sections of the perforations is only a small fraction of the bottom face of said bottom wall; first controllable heating means in said bottom wall for maintaining the latter at the first predetermined temperature so that the material in said perforations will melt and flow in downward direction through said perforations; a collecting trough of heat conductive material arranged beneath said bottom wall and having a cavity for receiving the molten material flowing downwardly through said perforations; second controllable heating means cooperating with said collecting trough for maintaining the latter and the material in the cavity therein at a second predetermined temperature higher than said first predetermined temperature; a heat insulator sandwiched between said container and said collecting trough for preventing heat transmission from the latter to said container; and means for discharging the liquefied material from the cavity of said collecting trough.

2. An apparatus as defined in claim 1, wherein said perforations taper in a stepless manner.

3. An apparatus as defined in claim 1, wherein each of said perforations has at least in the upper regions thereof the shape of a downwardly tapering truncated pyramid and wherein said perforations are arranged in the form of a quadrangular raster.

4. An apparatus as defined in claim 1, wherein each of said perforations has at least in a lower region thereof the shape of a downwardly tapering truncated cone.

5. An apparatus as defined in claim 1, wherein said first heating means comprise electrical resistance heating elements in said ribs.

6. An apparatus as defined in claim 1, wherein the open cross-section of each perforation at the upper face of said bottom wall is equal to that of a circle having a diameter of about 40–100% of said predetermined height.

7. An apparatus as defined in claim 1, wherein the open cross-section of each perforation at said upper face of said bottom wall is equal to that of a circle having a diameter of 55–70% of said predetermined height.

8. An apparatus as defined in claim 1, wherein said predetermined height is 40–100 millimeters.

9. An apparatus as defined in claim 1, wherein said predetermined height is between 50–70 millimeters.

10. An apparatus as defined in claim 1, wherein the sum of the open cross-sections of the perforations at the upper face of said bottom wall is between 85–95% of the total area of said upper face.

11. An apparatus as defined in claim 1, wherein the sum of the open cross-sections of the perforations at the upper face of said bottom wall is about 90% of the total area of said upper face.

12. An apparatus as defined in claim 1, wherein the sum of the smallest cross-sections of the perforations is between 3 and 15% of the total area of the bottom face of said bottom wall.

13. An apparatus as defined in claim 1, wherein the sum of the smallest open cross-sections of the perforations is between 4 and 8% of the total area of the bottom face of said bottom wall.

14. An apparatus as defined in claim 1, wherein said discharge means comprises a gear pump and drive means for driving said gear pump.

15. An apparatus as defined in claim 1, and including an insulating jacket surrounding said supply container laterally spaced therefrom.

* * * * *